(12) United States Patent
Grinchuk

(10) Patent No.: US 7,461,107 B2
(45) Date of Patent: Dec. 2, 2008

(54) CONVERTER CIRCUIT FOR CONVERTING 1-REDUNDANT REPRESENTATION OF AN INTEGER

(75) Inventor: Mikhail I. Grinchuk, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 32 days.

(21) Appl. No.: 11/689,924

(22) Filed: Mar. 22, 2007

(65) Prior Publication Data

US 2007/0180014 A1    Aug. 2, 2007

Related U.S. Application Data

(62) Division of application No. 10/348,538, filed on Jan. 21, 2003, now Pat. No. 7,213,043.

(51) Int. Cl.
    *G06F 7/00* (2006.01)
(52) U.S. Cl. ........................ 708/204; 708/493
(58) Field of Classification Search ................ 708/204, 708/493
    See application file for complete search history.

(56) References Cited

U.S. PATENT DOCUMENTS

| | | | |
|---|---|---|---|
| 3,535,502 A | | 10/1970 | Clapper |
| 4,138,731 A | | 2/1979 | Kamimoto et al. |
| 5,050,120 A | * | 9/1991 | Houk .......................... 708/491 |
| 5,181,186 A | | 1/1993 | Al-Ofi |
| 5,289,398 A | * | 2/1994 | Miyoshi et al. ............. 708/493 |
| 5,986,587 A | * | 11/1999 | Fukuda ........................ 341/57 |
| 2002/0174157 A1 | * | 11/2002 | Bhushan et al. ............. 708/671 |

* cited by examiner

*Primary Examiner*—Chuong D Ngo
(74) *Attorney, Agent, or Firm*—Westman, Champlin & Kelly

(57) ABSTRACT

A fixed-point arithmetic unit comprises a plurality of full-adders and half-adders arranged in at least an input row and an output row. A plurality of inputs to the input row is arranged to receive bits comprising a sparse-redundant representation of the integer. A converter converts 1-redundant representations of the integer to the space (1/K)-redundant representations. A process is described to design rows of a multiplier by identifying a distribution of multiplication product groups, and transforming the distribution of multiplication product groups to adders to occupy a highest unoccupied row of the multiplier.

5 Claims, 9 Drawing Sheets

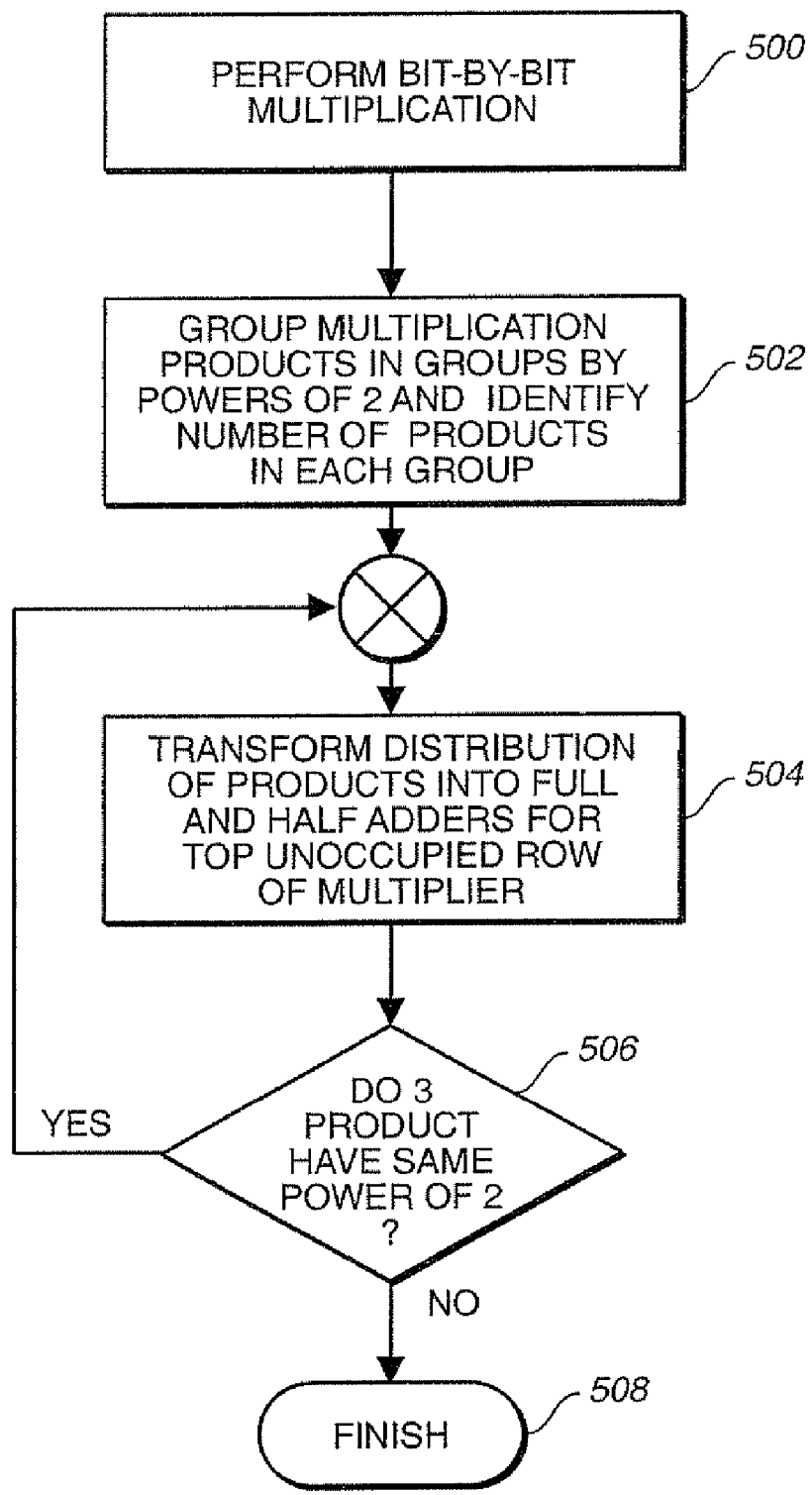
FIG._5

| power of 2 | 18 | 17 | 16 | 15 | 14 | 13 | 12 | 11 | 10 | 9 | 8 | 7 | 6 | 5 | 4 | 3 | 2 | 1 | 0 | total |
|---|---|---|---|---|---|---|---|---|---|---|---|---|---|---|---|---|---|---|---|---|
| (a) | 1 | 2 | 3 | 4 | 5 | 6 | 7 | 8 | 9 | 10 | 9 | 8 | 7 | 6 | 5 | 4 | 3 | 2 | 1 | 100 |
| (b) | 1 | 4 | 6 | 6 | 9 | 12 | 11 | 14 | 18 | 16 | 15 | 14 | 11 | 10 | 8 | 6 | 5 | 2 | 1 | 169 |

FIG._6 GROUPING BY POWERS OF 2

| (a) | | | | | | | | | | | | | | | | | | | | total |
|---|---|---|---|---|---|---|---|---|---|---|---|---|---|---|---|---|---|---|---|---|
| input distribution | 1 | 2 | 3 | 4 | 5 | 6 | 7 | 8 | 9 | 10 | 9 | 8 | 7 | 6 | 5 | 4 | 3 | 2 | 1 | |
| # of full adders | 0 | 0 | 1 | 1 | 1 | 2 | 2 | 3 | 3 | 3 | 3 | 2 | 2 | 2 | 1 | 1 | 1 | 0 | 0 | 27 |
| # of half adders | 0 | 1 | 0 | 0 | 1 | 0 | 0 | 1 | 0 | 0 | 1 | 0 | 0 | 1 | 0 | 0 | 1 | 0 | 0 | 6 |
| remaining bits | 1 | 0 | 0 | 1 | 0 | 0 | 1 | 0 | 0 | 1 | 0 | 0 | 1 | 0 | 0 | 1 | 0 | 0 | 0 | |
| output distribution | 2 | 2 | 2 | 4 | 4 | 4 | 5 | 5 | 6 | 6 | 6 | 5 | 5 | 4 | 3 | 3 | 2 | 1 | 1 | |

| (b) | | | | | | | | | | | | | | | | | | | | total |
|---|---|---|---|---|---|---|---|---|---|---|---|---|---|---|---|---|---|---|---|---|
| input distribution | 1 | 4 | 6 | 6 | 9 | 12 | 11 | 14 | 18 | 16 | 15 | 14 | 11 | 10 | 8 | 6 | 5 | 2 | 1 | |
| # of full adders | 0 | 1 | 2 | 2 | 3 | 4 | 3 | 4 | 6 | 5 | 5 | 4 | 3 | 3 | 2 | 2 | 1 | 0 | 0 | 50 |
| # of half adders | 0 | 0 | 0 | 0 | 0 | 0 | 1 | 1 | 0 | 0 | 0 | 1 | 0 | 1 | 0 | 1 | 0 | 1 | 1 | 7 |
| remaining bits | 1 | 1 | 0 | 0 | 0 | 0 | 0 | 0 | 0 | 1 | 0 | 0 | 1 | 0 | 0 | 0 | 0 | 0 | 1 | |
| output distribution | 2 | 4 | 4 | 5 | 7 | 8 | 9 | 11 | 11 | 11 | 10 | 9 | 7 | 7 | 5 | 4 | 3 | 1 | 1 | |

FIG._7 AFTER THE 1ST ROW OF FULL AND HALF ADDERS

FIG. 8 AFTER THE 2ND ROW OF FULL AND HALF ADDERS (19TH POWER OF 2 IS USED)

(a)
| | | | | | | | | | | | | | | | | | | | | | total |
|---|---|---|---|---|---|---|---|---|---|---|---|---|---|---|---|---|---|---|---|---|---|
| input distribution | 0 | 2 | 2 | 2 | 4 | 4 | 4 | 6 | 6 | 6 | 7 | 6 | 5 | 5 | 4 | 3 | 3 | 2 | 1 | 1 | |
| # of full adders | 0 | 0 | 0 | 1 | 1 | 1 | 1 | 2 | 2 | 2 | 2 | 2 | 1 | 1 | 1 | 1 | 0 | 0 | 0 | 0 | 18 |
| # of half adders | 0 | 1 | 1 | 0 | 0 | 0 | 1 | 0 | 0 | 0 | 0 | 0 | 1 | 1 | 0 | 0 | 1 | 1 | 0 | 0 | 6 |
| remaining bits | 0 | 0 | 0 | 0 | 1 | 1 | 1 | 0 | 0 | 0 | 1 | 0 | 0 | 0 | 1 | 0 | 0 | 0 | 1 | 1 | |
| output distribution 1 | 1 | 2 | 2 | 2 | 3 | 4 | 4 | 4 | 4 | 4 | 5 | 4 | 3 | 3 | 3 | 2 | 1 | 1 | 1 | 1 | |

(b)
| | | | | | | | | | | | | | | | | | | | | | total |
|---|---|---|---|---|---|---|---|---|---|---|---|---|---|---|---|---|---|---|---|---|---|
| input distribution | 0 | 2 | 4 | 4 | 5 | 7 | 8 | 9 | 11 | 11 | 11 | 10 | 9 | 7 | 5 | 4 | 3 | 3 | 1 | 1 | |
| # of full adders | 0 | 1 | 1 | 1 | 1 | 2 | 2 | 3 | 3 | 3 | 3 | 3 | 3 | 2 | 1 | 1 | 1 | 0 | 0 | 0 | 32 |
| # of half adders | 0 | 0 | 0 | 0 | 1 | 0 | 1 | 0 | 1 | 1 | 1 | 0 | 0 | 0 | 1 | 0 | 0 | 1 | 1 | 1 | 7 |
| remaining bits | 0 | 1 | 0 | 1 | 0 | 1 | 0 | 0 | 0 | 0 | 0 | 1 | 0 | 0 | 0 | 1 | 0 | 1 | 1 | 1 | |
| output distribution 1 | 2 | 3 | 4 | 4 | 5 | 6 | 7 | 8 | 7 | 7 | 7 | 7 | 5 | 3 | 3 | 3 | 1 | 1 | 1 | 1 | |

FIG. 9 AFTER THE 3RD ROW OF FULL AND HALF ADDERS (a)
| | | | | | | | | | | | | | | | | | | | | | total |
|---|---|---|---|---|---|---|---|---|---|---|---|---|---|---|---|---|---|---|---|---|---|
| input distribution | 1 | 2 | 2 | 2 | 3 | 4 | 4 | 4 | 4 | 4 | 5 | 4 | 3 | 3 | 3 | 2 | 1 | 1 | 1 | 1 | |
| # of full adders | 0 | 0 | 0 | 1 | 1 | 1 | 1 | 1 | 1 | 1 | 1 | 1 | 1 | 1 | 0 | 0 | 0 | 0 | 0 | 0 | 11 |
| # of half adders | 0 | 1 | 1 | 0 | 0 | 0 | 0 | 0 | 0 | 0 | 1 | 0 | 0 | 0 | 1 | 1 | 1 | 1 | 0 | 0 | 6 |
| remaining bits | 1 | 0 | 0 | 0 | 0 | 1 | 1 | 1 | 1 | 1 | 0 | 1 | 0 | 0 | 1 | 0 | 0 | 0 | 1 | 1 | |
| output distribution 2 | 2 | 2 | 2 | 2 | 3 | 3 | 3 | 3 | 3 | 4 | 3 | 2 | 2 | 2 | 1 | 1 | 1 | 1 | 1 | 1 | |

(b)
| | | | | | | | | | | | | | | | | | | | | | total |
|---|---|---|---|---|---|---|---|---|---|---|---|---|---|---|---|---|---|---|---|---|---|
| input distribution | 1 | 2 | 3 | 4 | 4 | 6 | 7 | 8 | 8 | 7 | 7 | 5 | 5 | 3 | 3 | 3 | 1 | 1 | 1 | 1 | |
| # of full adders | 0 | 0 | 1 | 1 | 1 | 2 | 2 | 2 | 2 | 2 | 2 | 1 | 1 | 1 | 1 | 0 | 0 | 0 | 0 | 0 | 22 |
| # of half adders | 1 | 1 | 0 | 0 | 0 | 0 | 0 | 0 | 0 | 0 | 1 | 1 | 1 | 1 | 0 | 1 | 1 | 1 | 0 | 0 | 6 |
| remaining bits | 0 | 0 | 1 | 1 | 1 | 0 | 1 | 0 | 0 | 1 | 0 | 0 | 0 | 0 | 1 | 0 | 0 | 0 | 1 | 1 | |
| output distribution 2 | 2 | 2 | 3 | 4 | 4 | 5 | 5 | 5 | 4 | 4 | 4 | 3 | 2 | 2 | 2 | 1 | 1 | 1 | 1 | 1 | |

FIG. 10  AFTER THE 4TH ROW OF FULL AND HALF ADDERS (THE 20-TH POWER OF 2 IS NOT USED BECAUSE THE PRODUCT OF 10-BIT INTEGERS IS LESS THAN 2207 SO THIS BIT WILL BE CONSTANT 0)

(a)

| | | | | | | | | | | | | | | | | | | | | | | total |
|---|---|---|---|---|---|---|---|---|---|---|---|---|---|---|---|---|---|---|---|---|---|---|
| input distribution | 2 | 2 | 2 | 2 | 2 | 2 | 3 | 3 | 3 | 4 | 3 | 3 | 3 | 2 | 2 | 2 | 2 | 1 | 1 | 1 | 1 | |
| # of full adders | 0 | 0 | 0 | 0 | 0 | 0 | 1 | 1 | 1 | 1 | 1 | 1 | 0 | 0 | 0 | 0 | 0 | 0 | 0 | 0 | 1 | 7 |
| # of half adders | 1 | 1 | 1 | 1 | 1 | 1 | 0 | 0 | 0 | 0 | 0 | 1 | 1 | 1 | 1 | 1 | 0 | 0 | 0 | 0 | 1 | 9 |
| remaining bits | 0 | 0 | 0 | 0 | 0 | 0 | 0 | 0 | 0 | 1 | 0 | 0 | 0 | 0 | 0 | 0 | 1 | 1 | 1 | 1 | 1 | |
| output distribution | 2 | 2 | 2 | 2 | 2 | 2 | 2 | 2 | 2 | 3 | 2 | 2 | 2 | 2 | 2 | 2 | 1 | 1 | 1 | 1 | 1 | |

(b)

| | | | | | | | | | | | | | | | | | | | | | | total |
|---|---|---|---|---|---|---|---|---|---|---|---|---|---|---|---|---|---|---|---|---|---|---|
| input distribution | 2 | 2 | 2 | 2 | 3 | 4 | 4 | 5 | 5 | 5 | 5 | 4 | 4 | 3 | 2 | 2 | 2 | 1 | 1 | 1 | 1 | |
| # of full adders | 0 | 0 | 0 | 0 | 1 | 1 | 1 | 1 | 1 | 1 | 1 | 1 | 1 | 1 | 0 | 0 | 0 | 0 | 0 | 0 | 1 | 14 |
| # of half adders | 1 | 1 | 1 | 1 | 0 | 0 | 0 | 1 | 0 | 0 | 0 | 0 | 0 | 0 | 1 | 1 | 1 | 0 | 0 | 0 | 1 | 7 |
| remaining bits | 0 | 0 | 0 | 0 | 1 | 1 | 1 | 0 | 0 | 1 | 1 | 1 | 1 | 1 | 0 | 0 | 0 | 1 | 1 | 1 | 1 | |
| output distribution | 2 | 2 | 2 | 2 | 3 | 4 | 4 | 3 | 4 | 4 | 4 | 3 | 3 | 3 | 2 | 2 | 2 | 1 | 1 | 1 | 1 | |

(a)

|  |  |  |  |  |  |  |  |  |  |  |  |  |  |  |  |  |  |  |  |  | total |
|---|---|---|---|---|---|---|---|---|---|---|---|---|---|---|---|---|---|---|---|---|---|
| input distribution | 2 | 2 | 2 | 2 | 2 | 2 | 2 | 2 | 2 | 2 | 2 | 2 | 2 | 2 | 2 | 2 | 2 | 1 | 1 | 1 | 1 |
| # of full adders | 0 | 0 | 0 | 0 | 0 | 0 | 0 | 0 | 0 | 0 | 0 | 0 | 0 | 0 | 0 | 0 | 0 | 0 | 0 | 0 | 1 |
| # of half adders | 1 | 1 | 1 | 1 | 1 | 1 | 1 | 1 | 1 | 1 | 1 | 1 | 1 | 1 | 1 | 1 | 1 | 0 | 0 | 0 | 14 |
| remaining bits | 0 | 0 | 0 | 0 | 0 | 0 | 0 | 0 | 0 | 0 | 0 | 0 | 0 | 0 | 0 | 0 | 0 | 1 | 1 | 1 |  |
| output distribution | 2 | 2 | 2 | 2 | 2 | 2 | 2 | 2 | 2 | 2 | 2 | 2 | 2 | 2 | 2 | 2 | 2 | 1 | 1 | 1 | 1 |

(b)

|  |  |  |  |  |  |  |  |  |  |  |  |  |  |  |  |  |  |  |  |  | total |
|---|---|---|---|---|---|---|---|---|---|---|---|---|---|---|---|---|---|---|---|---|---|
| input distribution | 2 | 2 | 2 | 2 | 2 | 2 | 3 | 4 | 4 | 4 | 4 | 3 | 3 | 3 | 2 | 2 | 2 | 1 | 1 | 1 | 1 |
| # of full adders | 0 | 0 | 0 | 0 | 0 | 0 | 1 | 1 | 1 | 1 | 1 | 1 | 1 | 1 | 0 | 0 | 0 | 0 | 0 | 0 | 0 |
| # of half adders | 1 | 1 | 1 | 1 | 1 | 1 | 0 | 0 | 0 | 0 | 0 | 0 | 0 | 0 | 1 | 1 | 1 | 0 | 0 | 0 | 10 |
| remaining bits | 0 | 0 | 0 | 0 | 0 | 0 | 0 | 1 | 1 | 1 | 1 | 0 | 0 | 0 | 0 | 0 | 0 | 1 | 1 | 1 | 5 |
| output distribution | 2 | 2 | 2 | 2 | 2 | 2 | 2 | 3 | 3 | 3 | 3 | 2 | 2 | 2 | 2 | 2 | 2 | 1 | 1 | 1 | 1 |

FIG._11 AFTER THE 5$^{TH}$ ROW OF FULL AND HALF ADDERS

(b)

|  |  |  |  |  |  |  |  |  |  |  |  |  |  |  |  |  |  |  |  |  | total |
|---|---|---|---|---|---|---|---|---|---|---|---|---|---|---|---|---|---|---|---|---|---|
| input distribution | 2 | 2 | 2 | 2 | 2 | 2 | 2 | 3 | 3 | 3 | 3 | 3 | 2 | 2 | 2 | 2 | 2 | 1 | 1 | 1 | 1 |
| # of full adders | 0 | 0 | 0 | 0 | 0 | 0 | 0 | 1 | 1 | 1 | 1 | 1 | 0 | 0 | 0 | 0 | 0 | 0 | 0 | 0 | 0 |
| # of half adders | 1 | 1 | 1 | 1 | 1 | 1 | 1 | 0 | 0 | 0 | 0 | 0 | 1 | 1 | 1 | 1 | 1 | 0 | 0 | 0 | 5 |
| remaining bits | 0 | 0 | 0 | 0 | 0 | 0 | 0 | 0 | 0 | 0 | 0 | 1 | 0 | 0 | 0 | 0 | 0 | 1 | 1 | 1 | 9 |
| output distribution | 2 | 2 | 2 | 2 | 2 | 2 | 2 | 2 | 2 | 2 | 2 | 2 | 1 | 1 | 1 | 1 | 1 | 1 | 1 | 1 | 1 |

FIG._12 AFTER 6$^{TH}$ ROW OF FULL AND HALF ADDERS (CASE (b) ONLY)

CONVERTER CIRCUIT FOR CONVERTING 1-REDUNDANT REPRESENTATION OF AN INTEGER

CROSS-REFERENCE TO RELATED APPLICATION

The present application is a divisional of and claims priority from U.S. patent application Ser. No. 10/348,538, filed Jan. 21, 2003, and issued as U.S. Pat. No. 7,213,043, the content of which is hereby incorporated by reference in its entirety.

FIELD

This invention relates to integer or fixed-point arithmetic devices for electronic processors, and particularly to integrated circuits that perform high speed fixed-point arithmetic operations with minimal logic gates.

BACKGROUND

Standard application specific integrated circuit (ASIC) modules that perform fixed-point arithmetic functions on numbers having N bits require at least log N levels of logic, producing a delay proportional to log N. It is known that the delay can be reduced by using long number formats, but long number formats require additional hardware (gates). Consequently, the ASIC design is usually selected as a trade-off of the delay and module size.

One design technique for faster fixed-point arithmetic modules is to use a "double size" representation in place of a standard N-bit representation of N-bit number. Integers of the range $0 \ldots 2^N-1$, or $-2^{N-1} \ldots 2^{N-1}-1$, are considered as pairs (A and B), where A and B each have N bits. Adders (and subtractors) can be implemented with a fixed delay that is not dependant on N.

A similar effect takes place for multipliers. For example, a "standard" multiplier implemented in the form of a Wallace tree with a final adder can be reduced to single Wallace tree, reducing the delay by about 30%. However, this faster multiplier will require approximately four times as many logic gates as the standard multiplier. Since a given multiplier already contains a high gate count, this faster multiplier is usually unacceptable.

Most integer arithmetic units employ redundant number representations.

The algebraic value of an N-bit redundant number $[X_{n-1}, X_{n-2}, \ldots X_1, X_0]$ (where $X_i \in \{-1, 0, 1\}$) is equal to $$\sum_{i=0}^{x-1} X_i * 2^i.$$

Redundant numbers are quite useful in adders (and subtractors) because of the property of performing additions without carry propagation. They are also useful in multipliers (and dividers) because redundant numbers do not require 2's complement methods to handle negative numbers. However, integer arithmetic units operate in what is referred to herein as a 1-redundant number system. Thus, the prior double-size adder designs and the multipliers employed 1-redundant concepts.

The present invention is directed to sparce-redundant arithmetic units that provide faster fixed-point arithmetic operations without significantly increasing the hardware implementation.

SUMMARY

The present invention provides a series of "intermediate" representations for integers and other fixed-point numbers that allow implementation of the fixed-point arithmetic module as a good compromise between simpler logic of standard integer arithmetic modules and speed-up benefits of double-size representations.

In one embodiment, a fixed-point arithmetic unit, which may be an adder or multiplier, performs arithmetic operations on N-bit integers. The arithmetic unit comprises a plurality of full-adders and half-adders arranged in at least an input row and an output row. A plurality of inputs to the input row is arranged to receive bits comprising a (1/K)-redundant representation of the integer, where K is an integer greater than 1 and less than N.

In other embodiments a converter, which may be coupled to the plurality of inputs of the arithmetic unit, converts 1-redundant representations of the integer to the (1/K)-redundant representations. The converter includes a (K−1)-bit adder receiving the (K−1) least significant bits of the 1-redundant representation of the integer to provide a group of K least significant bits of the (1/K)-redundant representation. A K'-bit adder receives the K' most significant bits of the 1-redundant representation to provide a group of K'+1 most significant bits of the (1/K)-redundant representation. At least one K-bit adder receives a group of K bits of the 1-redundant representation between the K' most significant bits and the K−1 least significant bits to provide a group K+1 bits of the (1/K)-redundant representation between the group of most significant bits and the group of least significant bits.

In another embodiment, rows of a multiplier in an integrated circuit are designed by identifying a distribution of multiplication product groups, if a number of multiplication products in any group is 3 or more, the distribution of multiplication product groups is transformed to adders to occupy a highest unoccupied row of the multiplier.

For the highest row of the multiplier, the distribution of multiplication product groups is achieved by bit-by-bit multiplication on the two input binary numbers. A plurality of multiplication products is identified, and the multiplication products resulting are distributed into groups by powers of 2. The number of multiplication products in each group is then identified. For second and subsequent rows, the number of multiplication products resulting from the transformation for the next higher row is identified.

The transformation is performed by applying as many full-adders as possible for each group having at least 3 multiplication products, starting with a group with the lowest power of 2, and adding any carry output to the number of multiplication products of the next higher group. Half-adders are applied to each group having 2 multiplication products and to any remainder outputs.

BRIEF DESCRIPTION OF THE DRAWINGS

FIG. 5 is a flowchart of a process of implementing a multiplier for (1/K)-redundant numbers.

FIGS. 6-12 illustrate steps of the process shown in FIG. 5.

DETAILED DESCRIPTION OF ILLUSTRATIVE EMBODIMENTS

A sparce-redundant representation of an N-bit integer, in the form of a (1/K)-redundant representation of a positive N-bit integer $X=2^{N-1}x_{N-1}+\ldots+4x_2+2x_1+x_0$, is a set of binary values $(y_0, \ldots, y_{N-1}; z_K, z_{2K}, \ldots, z_{[(N-1)/K]K})$, where $$X=2^{N-1}y_{N-1}+\ldots+4y_2+2y_1+y_0+2^K z_K+2^{2K}z_{2K}+\ldots+2^{[(N-1)/K]K}z_{[(N-1)/K]K}$$

Thus, a (1/K)-redundant representation of an N-bit number has approximately N+N/K bits, where each K-th position in the expansion on the power of 2 can have three different values:

00 represents a value of 0
01 and 10 each represents a value of 1
11 represents a value of 2.

It will be appreciated that the (1/K)-redundant representation is a general case of both a standard binary number (where K is large, i.e., K>N) and the double size input (where K=1, thus a 1-redundant representation).

Figure 1:
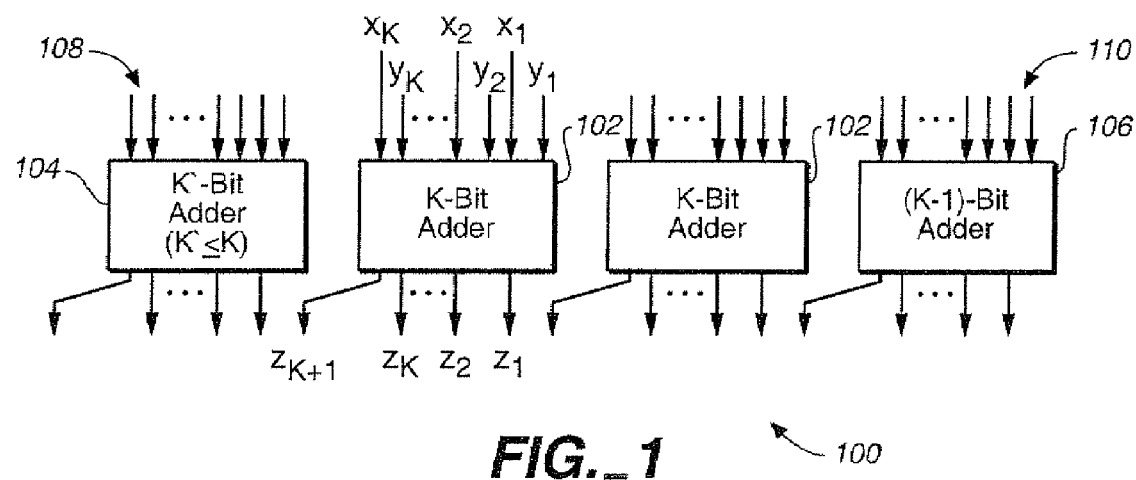
FIG. 1 is a block diagram of a conversion circuit from 1-redundant representations to (1/K)-redundant representations of N-bit numbers.

FIG. 1 illustrates a conversion circuit 100 that converts 1-redundant representations (K=1) of N-bit numbers to (1/K)-redundant representations. Circuit 100 uses approximately N/K (rounded up) binary adders comprising adders 102, 104 and 106. Each adder 102 has K input pairs $(x_1$ and $y_1$, $x_2$ and $y_2$, $x_3$ and $y_3$, $\ldots$, $x_K$ and $y_K)$ and (K+1) outputs $(z_1, z_2, \ldots, z_K, z_{K+1})$ to implement the addition operation:

$$\begin{array}{r} x_K \ldots x_2\ x_1 \\ y_K \ldots y_2\ y_1\ + \\ \hline z_{K+1}\ z_K \ldots z_2\ z_1 \end{array}$$

The leftmost, or most significant, adder 104 has K' input pairs and K'+1 outputs, where K'≦K. The rightmost, or least significant, adder 106 has K−1 input pairs and K outputs. The most significant input bit pair $(x_N, y_N)$ is pair 108 at the leftmost, or most significant, input of adder 104 and the least significant input bit pair $(x_1, y_1)$ is pair 110 at the rightmost, or least significant, input of adder 106. Since adders 102, 104 and 106 can be implemented with linear complexity and logarithmic delay, the conversion circuit has complexity and delay not more than $C_1 N$ and $C_2 \log K$, respectively, where $C_1$ and $C_2$ are constants. If each adder 102 has four input pairs (K=4) and the number N of input pairs is 14, N/K is 4 (rounded up), meaning circuit 100 can be constructed using four adders with the leftmost adder 104 having three input pairs (K'=3) and the rightmost adder 106 having K−1=3 input pairs. If N=13 and K=3, N/K is 5, meaning there are five adders composed of three adders 102, a leftmost adder 104 having two input pairs (K'=2) and a rightmost adder 106 having K−1=2 input pairs.

A 1-redundant addition of two (1/K)-redundant numbers can be accomplished using structures comprising full adders (FA) and half-adders (HA). Each full adder has three inputs, x, y and z, and each half-adder has two inputs x and y. Each full and half-adder provides two output bits, the left, or most significant, output bit being a carry bit and right, or least significant, output bit being a summation bit. Each full adder computes carry=xy OR xz OR yz, and sum=x+y+z(mod 2).

Each half-adder 122 computes carry=xy, and sum=x+y(mod 2).

Each half- and full-adder has the same (constant) depth and complexity.

Figure 2:
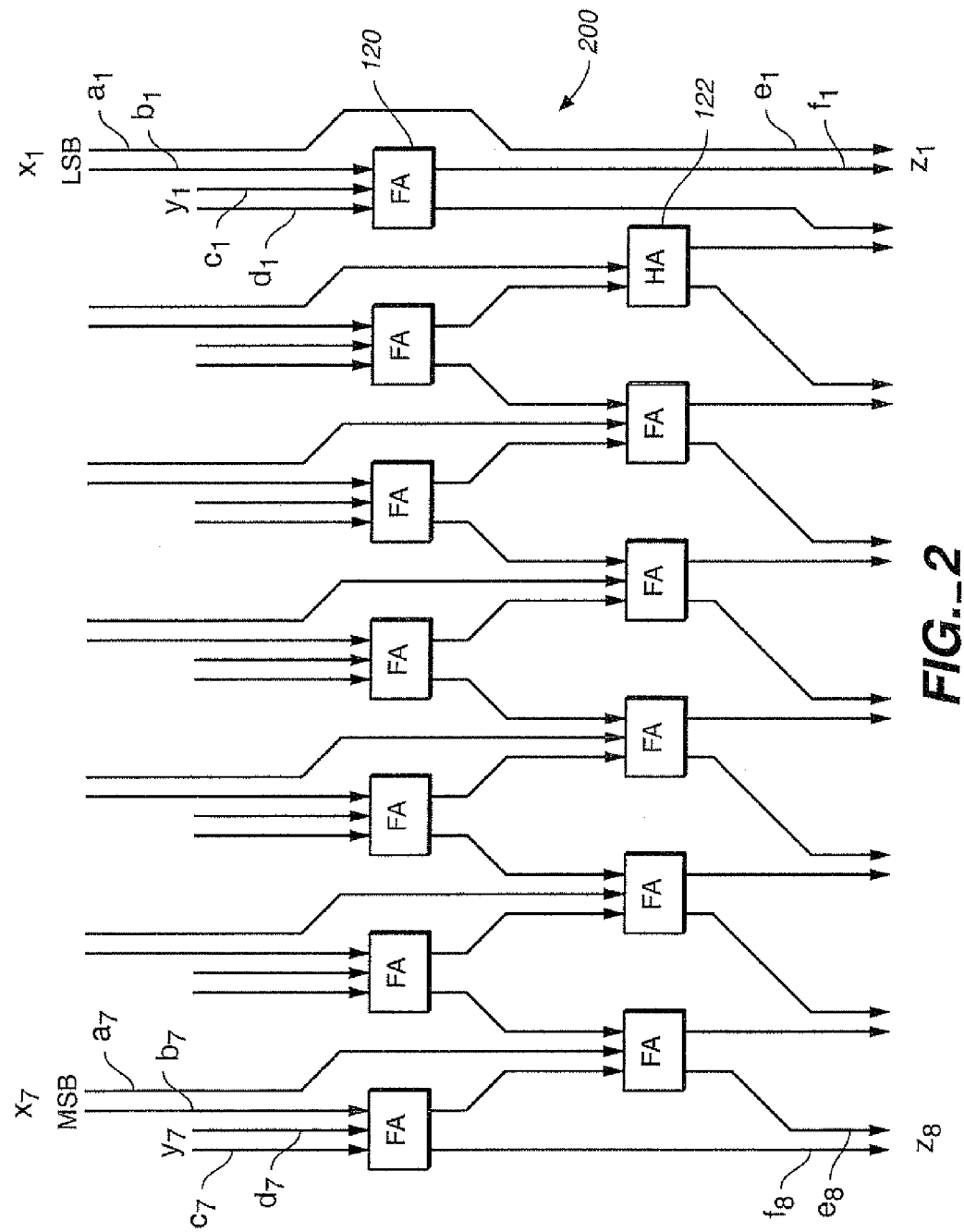
FIGS. 2-4 are diagrams addition circuits for 1-redundant, (½)-redundant and (⅓)-redundant inputs, respectively.
Figure 3:
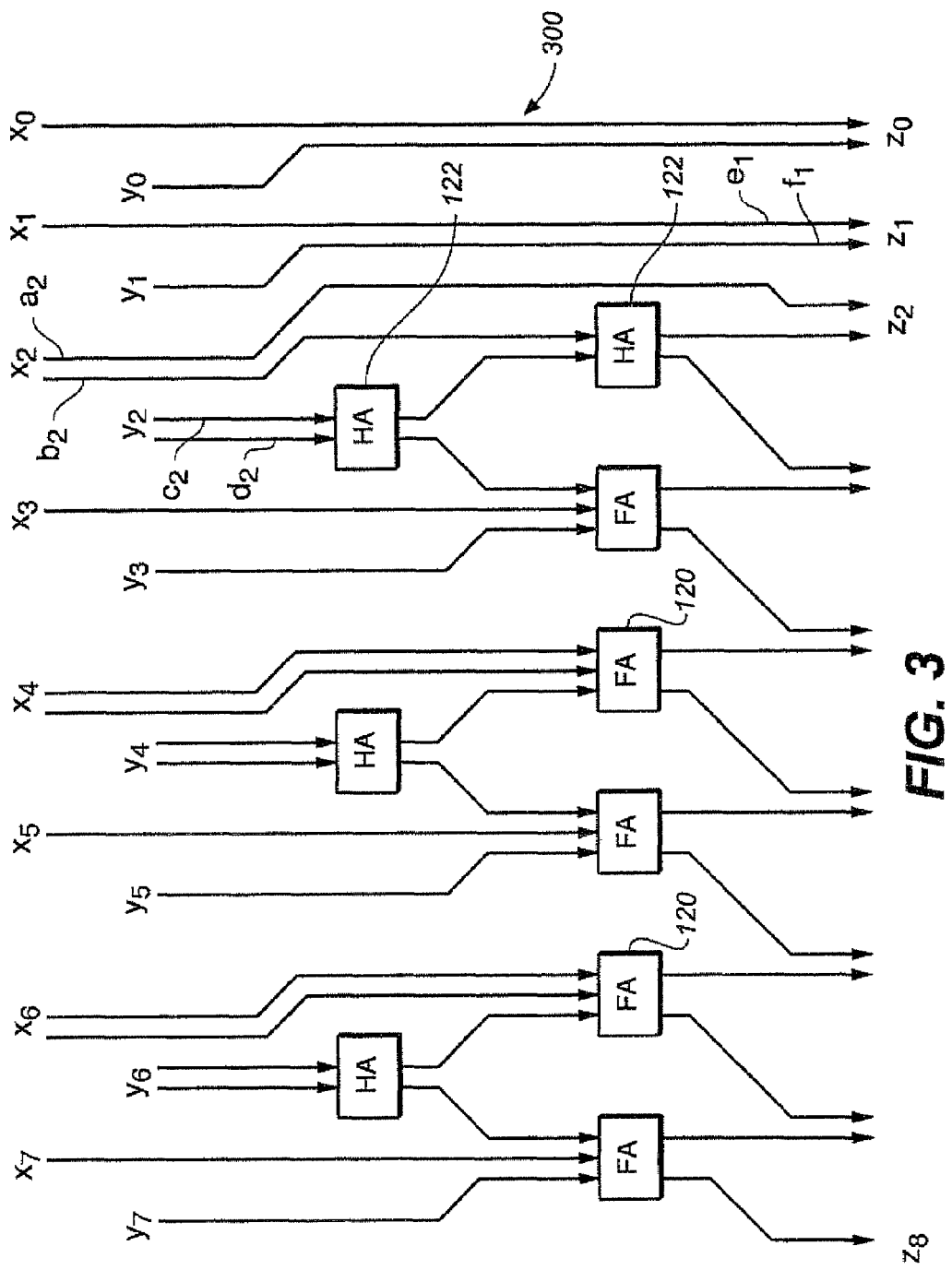
Figure 4:
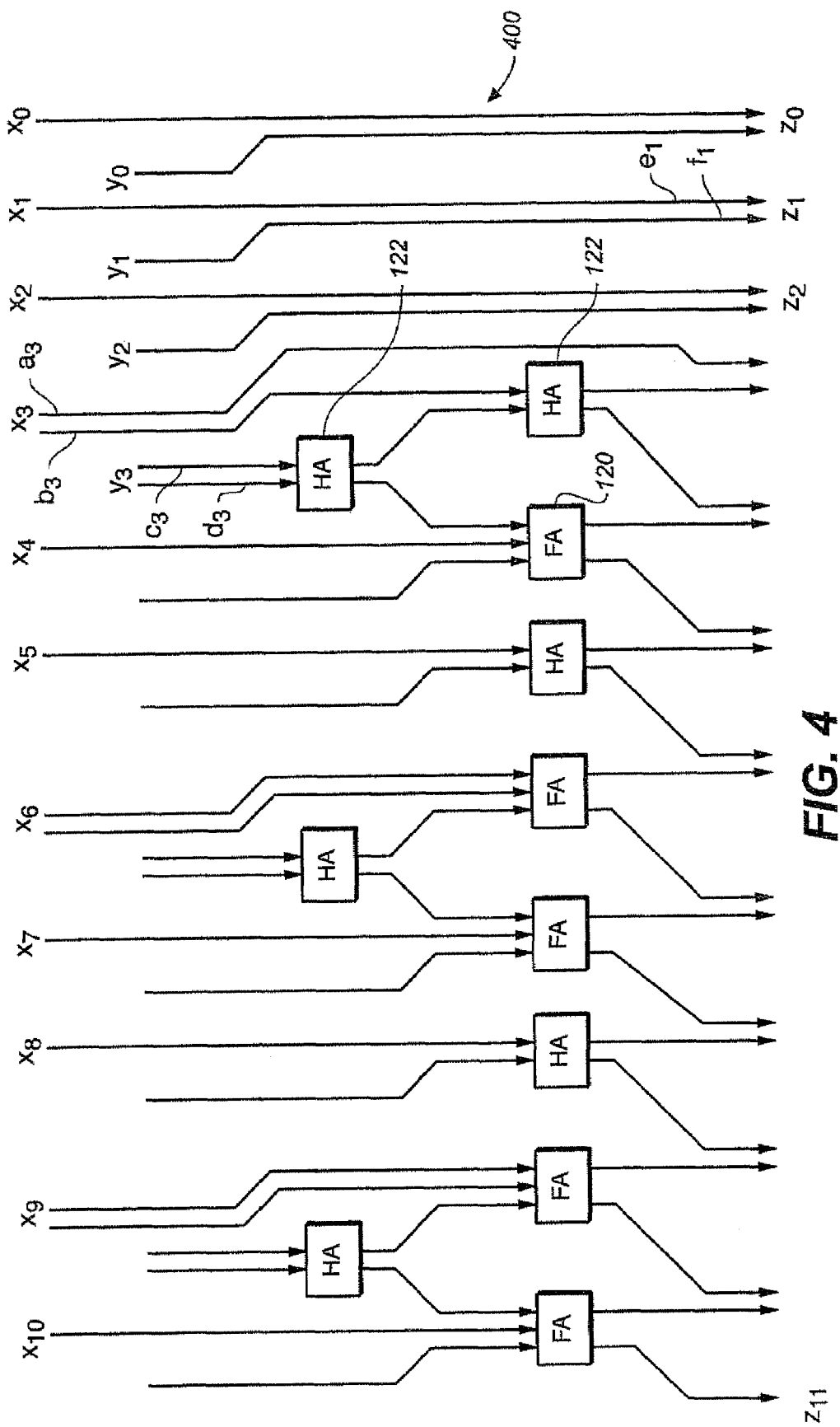

FIG. 2 illustrates an example (for N=7) of an adder circuit 200 having two 1-redundant (K=1) N-bit inputs X and Y. Input X is formed of binary pairs $x_1, x_2, \ldots, x_7$ having bits $a_1, a_2, \ldots, a_7$ and $b_1, b_2, \ldots, b_7$ and input Y is formed of binary pairs $y_1, y_2, \ldots, y_7$ having bits $c_1, c_2, \ldots, c_7$ and $d_1, d_2, \ldots, d_7$. Circuit 200 produces a 1-redundant (N+1)-bit output Z composed of binary pairs $z_1, z_2, \ldots, z_8$ having bits $e_1, e_2, \ldots, e_8$ and $f_1, f_2, \ldots, f_8$. In this case, adder circuit 200 requires 13 adders (12 full-adders 120 and one half-adder 122. FIG. 3 is an example (for K=2 and N=8) of an adder circuit 300 having two (1/K)-redundant N-bit inputs X and Y and a 1-redundant (N+1)-bit output Z. In this case, half of the inputs $(x_2, x_4, x_6, \ldots$ and $y_2, y_4, y_6, \ldots)$ are composed of respective binary pairs $a_2, b_2, a_4, b_4, a_6, b_6, \ldots$ and $c_2, d_2, c_4, d_4, c_6, d_6, \ldots$, whereas the other half of the input $(x_1, x_3, x_5, \ldots$ and $y_1, y_3, y_5, \ldots)$ are not binary pairs. Adder circuit 300 requires nine adders: five full-adders 120 and four half-adders 122. The circuit of FIG. 3 can be implemented for even values of N by elimination of the leftmost full adder and by supplying the left output of leftmost half adder directly to the output of the entire circuit. Thus, for N=6 adder circuit could be implemented in eight adders, four each of full-adders and half-adders. FIG. 4 is an example of an adder circuit 400 having two (1/K)-redundant N-bit inputs and 1-redundant (N+1)-bit output, where K=3, N=11. In this case, one-third of the inputs are binary pairs and the rest are not. As shown in FIG. 4, the configuration of left side of the circuit will depend on N mod K.

The adders 300 and 400 of FIGS. 3 and 4 can be implemented with the conversion circuit 100 of FIG. 1 by converting each of the numbers being added (or subtracted) from 1-redundant to (1/K)-redundant numbers using respective conversion circuits 100 and applying the appropriate (1/K)-redundant to 1-redundant number adder 300 or 400 to the converted (1/K)-redundant numbers to arrive at the summed result in 1-redundant number format. Consequently the adder circuit has a constant depth and linear complexity.

1-redundant subtraction can be reduced to addition, because bit-wise negation ~X of an N-bit (1/K)-redundant number X satisfies the equation X+~X+const(N, K)=0 for some constant that depends only on N and K; that is, −X=~X+const(N, K) and Y−X=Y+~X+const(N, K). Therefore, a subtractor also has constant depth and linear complexity.

Comparison of two (1/K)-redundant numbers is almost as fast as "standard" comparison, because calculation of 1-redundant difference of A-B requires only a constant delay, and a comparison of a 1-redundant number with 0 is the same operation as comparison of two "usual" numbers.

FIGS. 5-12 consider the case of 1-redundant multiplication of two (1/K)-redundant numbers. Consider a 1-redundant multiplication of two 0-redundant N-bit numbers has a delay D(N) and complexity C(N) over a given set of logical gates when implemented using the Wallace tree method. Consequently, 1-redundant multiplication of two (1/K)-redundant numbers can be implemented with delay D(N)+const using approximately $(1+1/K)^2 C(N)$ gates.

Ordinary multiplication starts from producing $N^2$ bit-by-bit products $a_i \cdot b_i$, which can be organized into N N-bit numbers. The Wallace tree reduces these $N^2$ bits to a pair of 2N-bit numbers using approximately $N^2$ full adders; the tree has depth (or delay) of about const*log N (where the value of the constant depends on the full adder's delays).

This approach requires only a minor modification for (1/K)-redundant case. More particularly, the (1/K)-redundant case produces approximately $(1+1/K)^2N^2$ bit-by-bit products which can be organized into $(1+1/K)^2N$ N-bit numbers. A Wallace tree implementing the multiplier will require approximately $(1+1/K)^2N^2$ full adders, and depth (or delay) of const*log $(N(1+1/K)^2)$. Thus, the total complexity will be multiplied by $(1+1/K)^2$, but the delay (or depth) will grow not more than 2*const*log (1+1/K).

FIG. 5 is a flowchart of the process of constructing a 1-redundant multiplier for two (1/K)-redundant numbers, and FIGS. 6-12 compare 10-bit 1-redundant multipliers for "regular" inputs (case (a)) and for (1/K)-redundant inputs (case (b)). More particularly, case (b) is in the specific form where K=3 using (⅓)-redundant inputs. At step 500, bit-by-bit multiplication products are generated. There will be 100 such products in the case (a) and 169 products in the case (b). At step 502, the products are grouped by the powers of 2, with a maximum product value of $2^{18}$ (thus, there are 19 groups) and the groups are distributed as shown in FIG. 6 to identify the number of products in each group. At step 504, if there is at least one instance of at least 3 products having the same power of 2, the distribution is transformed into the first row of the multiplier in as many full adders as possible, with any carry outputs applied directly to the values for the next higher power of 2. A half-adder is applied to any remainder values, and where there are exactly two values for the same power of 2. FIG. 7 shows the example of this transformation to reduce 100 bits of case (a) to 27 full adders and 6 half-adders in the first row, and will reduce 169 bits of case (b) to 50 full adders and 7 half-adders in the first row.

At step 506, if the output distribution still contains at least one instance of at least 3 products having the same power of 2, the process loops back to repeat step 504 and transform the distribution into the next row of the multiplier.

In the example, the output distribution from FIG. 7 becomes the input distribution for FIG. 8, and the transformation is applied again, providing 18 full adders and 6 half-adders to the second row of case (a) and 32 full adders and 7 half-adders to the second row of case (b). In the case of the second and following rows, it will be necessary to consider one more power of 2 value ($2^{19}$ in the example). As shown in FIGS. 8 and 12, the process continues to apply iterations of transformation process of step 504 until the output distributions contain a value of no more than 2 products for any given power of 2. Hence, case (a) will require 11 full adders and 6 half-adders in row three (FIG. 9), 7 full adders and 9 half-adders in row four (FIG. 10) and 1 full adder and 14 half-adders in row five (FIG. 11). Case (b) will require 22 full adders and 6 half-adders in row three (FIG. 9), 14 full adders and 7 half-adders in row four (FIG. 10), 10 full adders and 5 half-adders in row five (FIG. 11) and 5 full adders and 9 half-adders in row six (FIG. 12). Case (a) does not require a sixth row.

The total number of adders required to implement the circuits are 64 full adders and 41 half-adders (105 total elementary adders) to implement case (a) and 133 full adders and 41 half-adders (174 total elementary adders) to implement case (b). Thus, the number of adders necessary to implement the functions is approximately the same as the number of bits of either number being multiplied (100 bits in 105 adders for case (a) and 169 bits in 174 adders for case (b)). The delay (or depth) in the case (b) is greater by the one level of elementary adders than the delay or depth of case (a).

The (1/K)-redundant adder with a (1/K)-redundant input can be implemented using the circuit of FIGS. 3 and 4 with the conversion described in connection with FIG. 1. The resulting adder has a complexity proportional to N (almost without dependence on K), and a delay proportional to log K.

The (1/K)-redundant multiplier with a (1/K)-redundant output can be implemented by the process described in FIG. 5, also using the conversion described in connection with FIG. 1. The resulting circuit has complexity proportional to $N^2(1+1/K)^2$, and a delay proportional to $C_3$ log N+$C_4$ log K, where parameter $C_3$ describes delay of a Wallace tree with N leafs and parameter $C_4$ characterizes the delay of the K-bit adders). Since multipliers often are most space- and time-consuming logical units, the area and timing of the multiplier can be adjusted such that larger values of K leads to more compact implementation, but with a larger bit delay.

The present invention thus provides a sparce-redundant ((1/K)-redundant) fixed point arithmetic module, such as an adder, subtractor, comparator or multiplier. The process is preferably carried out using a processor operating under the control of a computer program code embedded memory, such as a magnetic disk to generate the design of the arithmetic module based on the size (N) of the input and K.

Although the present invention has been described with reference to preferred embodiments, workers skilled in the art will recognize that changes may be made in form and detail without departing from the spirit and scope of the invention.

What is claimed is:

1. A converter circuit for converting a 1-redundant representation of an N-bit integer to a (1/K)-redundant representation in the form $$2^{N-1}y_{N-1}+\ldots+4y_2+2y_1+y_0+2^Kz_K+2^{2K}z_{2K}+\ldots+2^{\lfloor(N-1)/K\rfloor K}z_{\lfloor(N-1)/K\rfloor K}, \text{ where}$$

$y_0, \ldots y_{N-1}$ and $z_K, z_{2K}, \ldots, z_{\lfloor(N-1)/K\rfloor K}$ are sets of binary values, the converter circuit comprising:

a (K−1)-bit adder receiving (K−1) least significant bits of the 1-redundant representation, the (K−1)-bit adder providing a group of K least significant bits of the (1/K)-redundant representation, where K is an integer greater than 1 and less than N;

a K'-bit adder receiving K' most significant bits of the 1-redundant representation, the K'-bit adder providing a group of K'+1 most significant bits of the (1/K)-redundant representation, wherein K' is an integer not greater than K; and at least one K-bit adder receiving a group of K bits of the 1-redundant representation between the K' most significant bits and the K−1 least significant bits, each K-bit adder providing a group K+1 bits of the (1/K)-redundant representation between the group of most significant bits and the group of least significant bits.

2. The converter circuit of claim 1, wherein the converter comprises circuit approximately N/K−2 K-bit adders.

3. A converter circuit comprising:

a 1-redundant input for receiving a 1-redundant representation of an N-bit integer;

a (1/K)-redundant output for providing a (1/K)-redundant representation of the N-bit integer, where K is an integer greater than 1 and less than N, and wherein each K-th position of the representation forms a two-bit signal having a respective binary significance;

a (K−1)-bit adder receiving (K−1) least significant bits of the 1-redundant representation, the (K−1)-bit adder providing a group of K least significant bits of the (1/K)-redundant representation to the output;

a K'-bit adder receiving K' most significant bits of the 1-redundant representation, the K'-bit adder providing a group of K'+1 most significant bits of the (1/K)-redundant representation to the output, wherein K' is an integer not greater than K, and at least one K-bit adder receiving a group of K bits of the 1-redundant representation between the K' most significant bits and the K−1 least significant bits, each K-bit adder providing to the output a group K+1 bits of the (1/K)-redundant representation between the group of most significant bits and the group of least significant bits.

4. The converter circuit of claim 3, wherein the (1/K)-redundant representation of the integer is in the form $$2^{N-1}y_{N-1}+ \ldots +4y_2+2y_1+y_0+2^K z_K+2^{2K}z_{2K}+ \ldots + 2^{[(N-1)/K]K}z_{[(N-1)/K]K}, \text{ where}$$

$y_0, \ldots, y_{N-1}$ and $z_K, z_{2K}, \ldots, z_{[(N-1)/K]K}$ are sets of binary values.

5. The converter circuit of claim 3, wherein the converter circuit comprises approximately N/K−2 K-bit adders.

* * * * *